United States Patent [19]

Saxman

[11] 4,040,493

[45] Aug. 9, 1977

[54] ROCK BORING CUTTER WITH THREAD-ON REPLACEABLE CUTTING ELEMENT

[75] Inventor: William Craig Saxman, Irving, Tex.

[73] Assignee: Dresser Industries, Inc., Dallas, Tex.

[21] Appl. No.: 685,838

[22] Filed: May 13, 1976

[51] Int. Cl.$^2$ .............................................. E21B 9/08
[52] U.S. Cl. ................................... 175/374; 175/372
[58] Field of Search ............... 175/334, 336, 374, 355, 175/344, 352, 351, 372, 371, 373

[56] References Cited

U.S. PATENT DOCUMENTS

| 1,143,275 | 6/1915 | Hughes | 175/373 X |
| 3,204,710 | 9/1965 | Bechem | 175/344 |
| 3,216,513 | 11/1965 | Robbins et al. | 175/374 X |
| 3,612,197 | 10/1971 | Motoyama | 175/374 X |
| 3,858,670 | 1/1975 | Ott | 175/374 |

FOREIGN PATENT DOCUMENTS

| 530,052 | 7/1954 | Belgium | 175/372 |

*Primary Examiner*—Ernest R. Purser
*Assistant Examiner*—Richard E. Favreau
*Attorney, Agent, or Firm*—Eddie E. Scott

[57] ABSTRACT

A cutter with a replaceable cutting element is adapted to be mounted upon the rotary head of an earth boring machine or upon the body of an earth boring bit. The cutter is used in conjunction with an earth boring machine that functions to form a borehole or tunnel in the formation being bored. The cutter may operate to fracture rock between a proximate pair of kerfs in a manner to cause fragments of the formation to be separated from the formation being bored or may crush and disintegrate the formation. At least one annular cutting element is mounted on the periphery of the cutter body for contacting the formations. The cutter body includes an external annular threaded surface between the ends of the cutter body. The cutting element includes a threaded inner surface that mates with the threads on the cutter body. A locking shoulder on the cutter body is in contact with a locking shoulder on the cutting element.

2 Claims, 4 Drawing Figures

ROCK BORING CUTTER WITH THREAD-ON REPLACEABLE CUTTING ELEMENT

BACKGROUND OF THE INVENTION

The present invention relates to the art of earth boring and more particularly to an earth boring cutter with a thread-on replaceable cutting element.

Conventionally, rotary drilling apparatus and particularly rotary drilling apparatus for boring large diameter holes and tunnels includes a multiplicity of roller cutters. A number of the roller cutters together with their bearings and the saddles in which the cutters and bearings are mounted are positioned on a rotary head or a bit body and used to form holes in the formation being bored. The roller cutters may be conveniently mounted on the rotary cutting head of a tunneling machine or on the body of a raise bit. The cutters may be disc type cutters or full face cutters.

A disc type roller cutter is effective in very soft to medium formations. The disc is usually a heat treated alloy steel cutter with an included angle between about 60° and 90°. The disc cutters are usually indexed two or three inches apart. In effect, the disc cutters plow concentric circles around the face of the formation being bored. The cutting discs are indexed so that the formation between discs will break out completely under a given load and R. P. M. This is a very efficient way to cut formations because the cuttings come off the face in relatively large pieces. Disc cutters are not economical in harder formations because the discs dull out quickly in the harder abrasive formations. This is especially detrimental in shaft drilling or raise drilling operations where trip time is costly. It is not practical to make the discs completely of carbide and the brazing on of continuous sintered carbide tips or wedges is also of questionable feasibility from an economical and operational standpoint. Since the bearing life of the roller cutters long outlasts the life of the cutting structure, the cutting structure should be replaced periodically thereby extending the useful lifetime of the cutter. Replacement should be easily possible in the field.

DESCRIPTION OF PRIOR ART

A general indication of the nature of the prior art relating to roller disc type cutters may be obtained from a consideration of the disclosures in the following U.S. patents. In U.S. Pat. No. 3,139,148 to J. S. Robbins, patented June 30, 1964, a rotary boring head having roller cutter discs is shown. A plurality of roller cutter discs are mounted on a support plate adapted to rotate about a horizontal axis. In U.S. Pat. No. 3,216,513 to R. J. Robbins, et al, patented Nov. 9, 1965, cutter assemblies for rock drilling are shown. The cutter assemblies comprise a rotary cutting wheel having a peripheral cutting portion, mounting means including anti-friction bearings on which the cutting wheel is freely rotatable and resiliently cushioned metal-to-metal seal means outboard of the bearings. In U.S. Pat. No. 2,766,977 to J. S. Robbins, patented Oct. 16, 1965, a rotary cutter head for boring type continuous mining machines is shown. The cutter head includes a plurality of integrally connected wheels or rollers which cooperate with each other to effect a plurality of cutting and breaking actions against adjacent cores causing the cores to break easily and continuously thereby allowing rapid and continuous advance of the boring machine. In U.S. Pat. No. 3,444,939 to K. G. Bechem, patented May 20, 1969, a cutting roller for roller type enlarging bits is shown. The cutting roller projects through an opening in a shield. The shield is conical and the cutting ribs of the roller make contact with the rock to be cut along lines generally parallel to the shield face. In U.S. Pat. No. 3,204,710 to K. G. Bechem, patented Sept. 7, 1965, an enlarging roller cutter is shown. According to the invention there is provided an enlarging roller cutter with one annular tooth disposed on a roller base member, characterized in that the annular tooth is disposed at the forward free end of a roller base member, and a free surface is left behind the said annular tooth, said cutter being designed to widening or enlarging a previously drilled or pilot hole. In U.S. Pat. No. 3,572,452 to D. F. Winberg, patented Mar. 30, 1971, a rolling cutter and seal therefor are shown. The cutter includes at least one bit having an encircling ring or an O-ring base. The bits have a cutting edge formed by two flat surfaces. The flat surfaces may be considered to be planes that rise to an edge. The bits are pressed into circular grooves in the rolling cutter body. In U.S. Pat. No. 3,596,724 to K. G. Bechem, patented Aug. 3, 1971, a cutting roller is shown. The cutting roller has two circumferentially extending parallel cutting ribs. Each rib is provided with a series of wear resistant exchangeable inserts which protect the crown and flank surface of the rib against wear.

The use of replaceable cutting elements in the related drill bit art is known and a representative indication of this art may be obtained from a consideration of the disclosures of the following patents. In U.S. Pat. No. 3,426,860 to G. A. Peterson, patented Feb. 11, 1969, a pilot bit with replaceable teeth is shown. The bit body contains a plurality of tooth holding sockets, a plurality of removable teeth and retainers for holding the teeth in the sockets. In U.S. Pat. No. 1,678,201 to J. P. Samuelson, patented July 24, 1928, a rotary drill bit is shown. The bit includes a cutting element which is formed of identical segments having elongated slots to accommodate bolts and permit the segments to be adjusted or replaced. In U.S. Pat. No. 1,143,275 to H. R. Hughes, patented June 15, 1915, a demountable cutting edge for drilling tools is shown. The cutting edge consists of a cutting or shearing blade in the form of a ring having its outer periphery formed with a knife edge. Set screws hold the cutting or shearing blade in place.

SUMMARY OF THE INVENTION

The present invention provides a cutter for an earth boring system that has a rotary unit which bores into earth formations to form a hole therein. The rotary unit functions to disintegrate the formations being bored and fracture rock in a manner that causes fragments of the formation to be separated from the formation being bored. The cutter of the present invention is rotatably connected to the rotary unit and adapted to contact the formations. A replaceable cutting element is mounted on the periphery of the cutter. The replaceable cutting element allows the cutting structure to be replaced in the field. The aforementioned advantages of the present invention and other features and advantages will become apparent from a consideration of the following detailed description of the invention when taken in conjunction with the drawings.

DETAILED DESCRIPTION OF THE INVENTION

Figure 1:
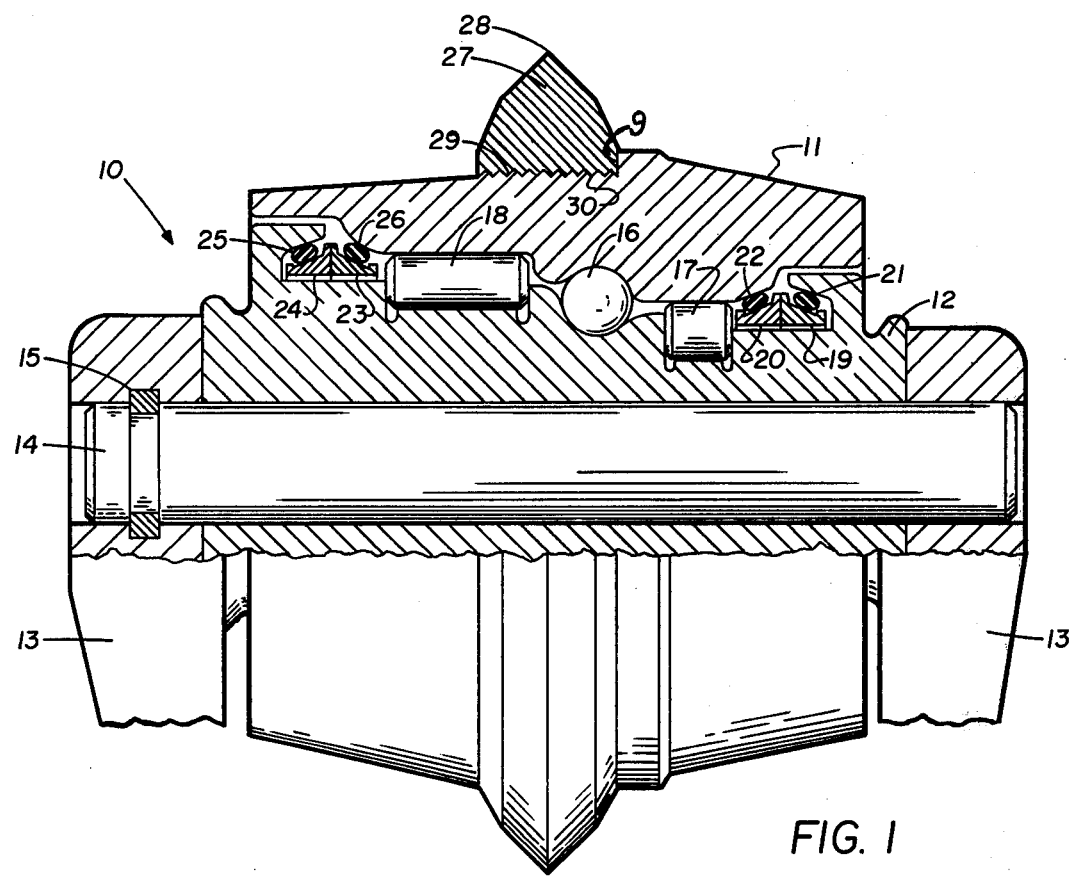
FIG. 1 is an illustration of a cutter constructed in accordance with the present invention positioned in a saddle that is adapted to be connected to a rotary unit of an earth boring system.
Figure 2:
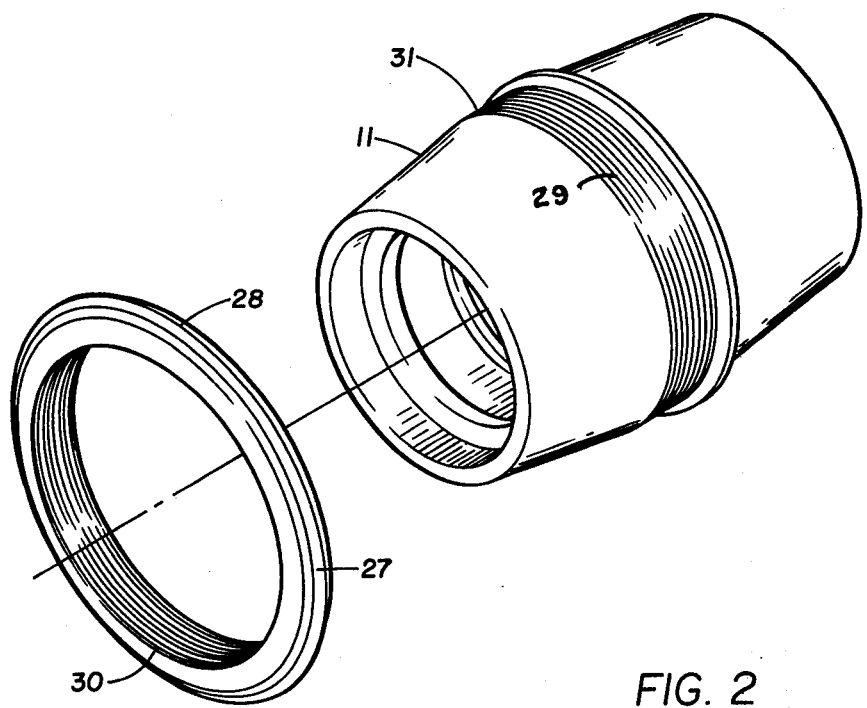
FIG. 2 is an exploded view of the cutter shown in FIG. 1.

Referring now to FIGS. 1 and 2, a roller disc cutter constructed in accordance with the present invention and generally designated by the reference numeral 10 is illustrated. The cutter 10 includes a cutter shell 11 positioned around a bearing shell 12 with bearing shell 12 being securely locked in a saddle mount 13. The saddle mount 13 may be connected to the rotary head of an earth boring machine or to the body of a bit for boring a large diameter hole. The bearing shell 12 is locked in position in the saddle mount 13 by a pin 14 and a retainer element 15. The retainer element is driven through a hole in the saddle mount. The bearing shell 12 remains firmly locked in place throughout the drilling operation due to a tenon and groove arrangement disclosed in U.S. Pat. No. 3,203,492 to C. L. Lichte, patented Aug. 31, 1965.

A multiplicity of bearing systems including a series of ball bearings 16, a series of inner roller bearings 17 and a series of outer roller bearings 18 promote rotation of the cutter shell 11 about the bearing shell 12. Lubricant is retained in the bearing area by two sets of seal elements. The inner set of seal elements includes a pair of annular metal seal rings 19 and 20 that are positioned near the inner end of the cutter 10. A flexible rubber O-ring 21 is positioned between seal ring 19 and the bearing shell 12 to retain the seal ring 19 in the desired position and resiliently urge seal ring 19 against seal ring 20. A flexible rubber O-ring 22 is positioned between the cutter shell 11 and the seal ring 20 to retain the seal ring 20 in the desired position and resiliently urge the seal ring 20 against seal ring 19. The outer set of seal elements includes a pair of annular metal seal rings 23 and 24 that are positioned near the outer end of cutter 10. A flexible O-ring 25 is positioned between the seal ring 24 and bearing shell 12 to retain the seal ring 24 in the desired position and resiliently urge seal ring 24 against seal ring 23. A flexible rubber O-ring 26 is positioned between the cutter shell 11 and seal ring 23 to retain seal ring 23 in the desired position and resiliently urge seal ring 23 against seal ring 24.

A section 31 of the outer surface of the cutter shell 11 is threaded with threads 29. The portions of the outer surface of the cutter shell 11 on each side of the threads 29 remain smooth and are not threaded. A shoulder 9 is provided adjacent the threads 29. An annular cutting element 27 is positioned around the cutter shell 11. The inside surface of the annular ring 27 is provided with threads 30. The threads 30 mate with the threads 29 on the cutter shell 11. One side of the annular ring 27 abuts against the shoulder 9. The outer surfaces of the cutting element 27 slope in wedge fashion to form cutting edge 28. In operation the edge 28 rolls along the formations to form a kerf therein. Portions of the formation between adjacent kerfs fracture out to form the desired hole.

The cutter 10 used in the proper earth boring operation will self-lock the cutting structure 27 to the cutter body 11 until replacement is required at the end of the cutting structure's service life. The replaceable cutting structure 27 may consist of steel or other abrasion resistant materials such as tungsten carbide or a combination of such materials. The locking occurs due to the shoulder 9 on the cutter body 11. Looking at the rotation of the cutter from the gage end toward the center of the head, clockwise rotation requires left-hand threads while counterclockwise rotation requires right-hand threads for proper locking of the cutting structure 27 to the body 11. Removal of a worn cutting structure only requires unthreading the cutting structure 27 from the cutter body 11. New cutting structure is inserted by simply hand-tight engagement of threads 29 and 30. The cutting structure 27 may be easily changed in the field with conventional hand tools, thus eliminating the use of expensive and time-consuming methods of conventional cutting structure replacement. The cutter of the present invention eliminates need for furnaces, presses or other impractical field equipment.

The structural details of a cutter 10 constructed in accordance with the present invention having been described, the operation of the cutter 10 will now be considered with reference to FIGS. 1 and 2. The cutter shell 11 is adapted to be mounted in a saddle that is affixed to the rotary head (not shown) of an earth boring machine or to the body of a raise bit. The cutting edge 28 of the cutting element 27 contacts the formations and forms a circular kerf therein. The portions of the formation between adjacent kerfs tend to fracture out and the fragments are separated from the formations being bored to form the desired hole or tunnel. Since the cutting edge 28 of the cutting element 27 generally becomes dull before any of the other elements of the roller cutter fail, it is desirable to replace the cutting element 27.

In order to replace cutting element 27, the retainer element 15 is driven out of place in the saddle mount 13 and pin 14 is removed from the saddle mount 13. The bearing shell 12 and cutter shell 11 are removed from the saddle mount 13. The inner annular cutting element 27 is unthreaded from the cutter shell 11. Generally, the shoulder 9 prevents the matching threads 29 and 30 from becoming tightly engaged and it is possible to unthread the cutting element 27 from the cutter shell 11. On occasions when it is impossible to unthread cutting element 27, the cutting element 27 may be severed and removed. For example, cutting element 27 could be severed at two points approximately 180° apart and the cutting element 27 removed in two sections. A new annular cutting element is threaded onto the cutter shell 11. The cutter shell 11 and bearing shell 12 are again inserted in the saddle mount 13. The pin 14 and retainer 15 are repositioned in the saddle mount 13 to lock the cutter in place. The cutter 10 is ready for continued operation.

Figure 3:
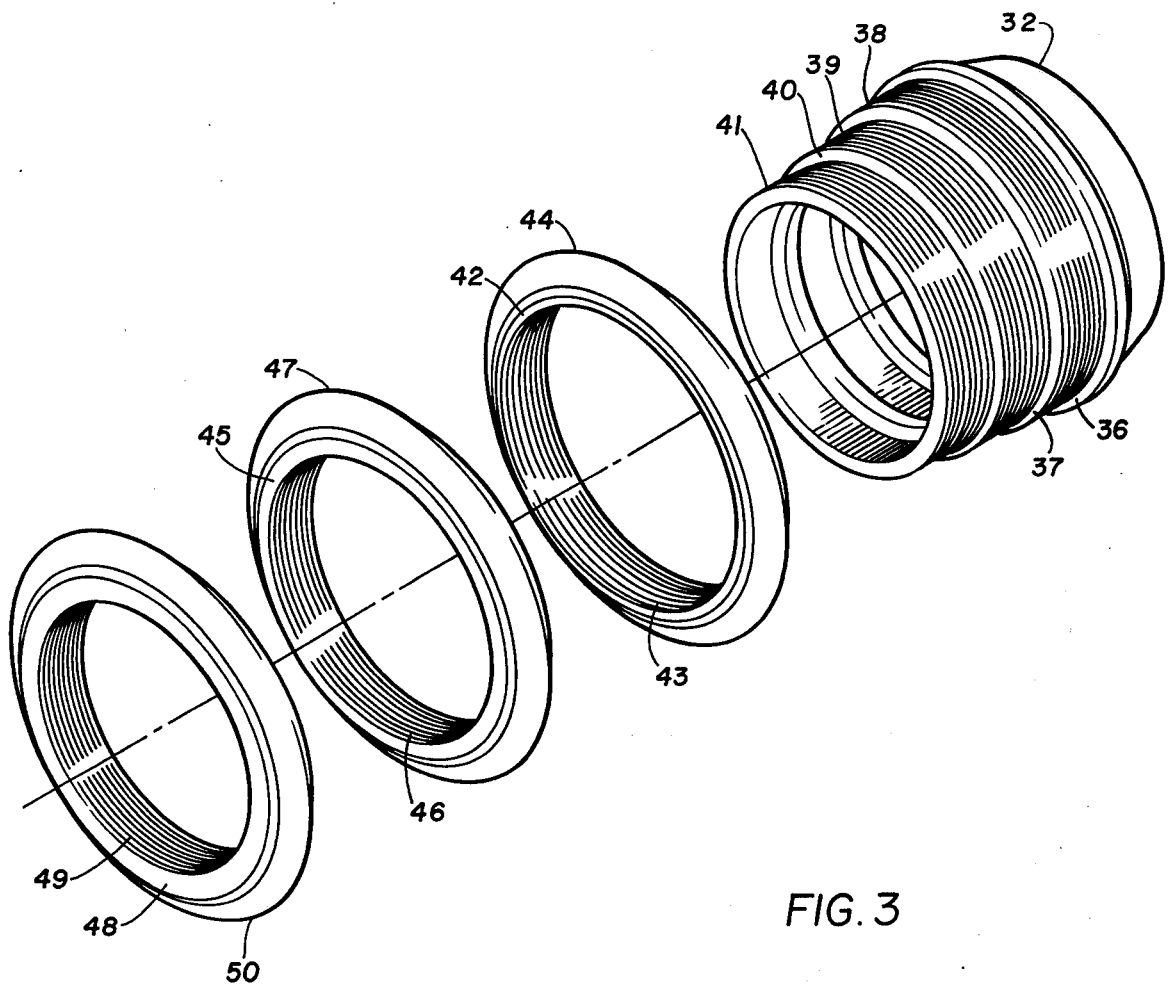
FIG. 3 is an illustration of another embodiment of the cutter of the present invention.

Referring now to FIG. 3, another embodiment of a roller cutter constructed in accordance with the present invention is illustrated. The cutter of this embodiment is a triple disc cutter adapted to form three individual kerfs in the formation being bored. The disc cutter of this embodiment is positioned in a saddle mount in the same fashion that the cutter illustrated in FIGS. 1 and 2 is positioned in a saddle mount. The cutter shell 32 is positioned over a bearing shell (not shown in FIG. 3) and is supported by a bearing system and lubrication system including conventional seal elements.

A first section of the outer surface of the cutter shell 32 is threaded with threads 38. A shoulder 36 is provided adjacent the threads 38. A first annular cutting ring 42 is adapted to be positioned around the cutter shell 32. The inside surface of the annular cutting ring 42 is provided with threads 43. The threads 43 mate with the threads 38 on the cutter shell 32. One side of the annular ring 42 abuts against the shoulder 36. The outer surfaces of the annular cutting ring 42 slope in wedge fashion to form a cutting edge 44. A second section of the outer surface of the cutter shell 32 immediately adjacent the threaded section 38 is provided with a second set of threads 39. A shoulder 37 is provided between the threaded section 39 and the threaded section 38. A second annular cutting ring 45 is adapted to be positioned around the cutter shell 32. The inside surface of the annular cutting ring 45 is provided with threads 46. The threads 46 mate with the threads 39 on the cutter shell 32. The inside surface of the second annular cutting ring 45 has a slightly smaller diameter than the inside surface of the first annular cutting ring 42. One side of annular ring 45 abuts against the shoulder 37. The outer surfaces of the cutting ring 45 slope in wedge fashion to form a cutting edge 47. A third section of the outer surface of the cutter shell 32 is threaded with a third set of threads 41. A shoulder 40 is provided between the threaded portion 41 and the threaded portion 39. A third annular cutting ring 48 is adapted to be positioned around the cutter shell 32. The inside surface of the annular cutting ring 48 is provided with threads 49. The threads 49 mate with the threads 41 on the cutter shell 32. The inside diameter of the third annular ring 48 is slightly smaller than the inside diameter of the second annular cutting ring 45. One side of the annular ring 48 abuts against the shoulder 40. The outer surfaces of the cutting ring 48 slope in wedge fashion to form a cutting edge 50. In operation, the cutting edges 44, 47, and 50 roll along the formations to form three individual kerfs therein. Portions of the formation between adjacent kerfs tend to fracture out to form the desired hole.

When the cutter shown in FIG. 3 is used in the proper earth boring operation, the annular cutting rings 42, 45, and 48 will self-lock to the cutter shell 32 until replacement is required at the end of the service life of the annular cutting rings 42, 45, and 48. The replaceable cutting rings 42, 45, and 48 may consist of steel or other abrasion resistant materials such as tungsten carbide or a combination of such materials. The locking occurs due to the shoulders 36, 37, and 40 on the cutter body 32. Looking at the rotation of the cutter from the gage end toward the center of the head, clockwise rotation requires left-hand threads while counterclockwise rotation requires right-hand threads for proper locking of the cutting rings 42, 45, and 48 to the body 32. Removal of the cutting rings require only unthreading the cutting structures from the cutter body. New cutting structures are inserted by simply hand-tight engagement of the respective threaded sections 38 and 43, 39 and 46, and 41 and 49. The annular cutting ring 42 having the largest inside diameter, is threaded on cutter shell 32 first. The intermediate cutting ring 45 is threaded on second and the cutting ring 48 having the smallest inside diameter is threaded on the cutter shell 32 last. The cutting structures may be easily changed in the field with conventional hand tools, thus eliminating the use of expensive and time-consuming methods of conventional cutting structure replacement. The cutter of the present invention eliminates the need for furnaces, presses, or other impractical field equipment.

Figure 4:
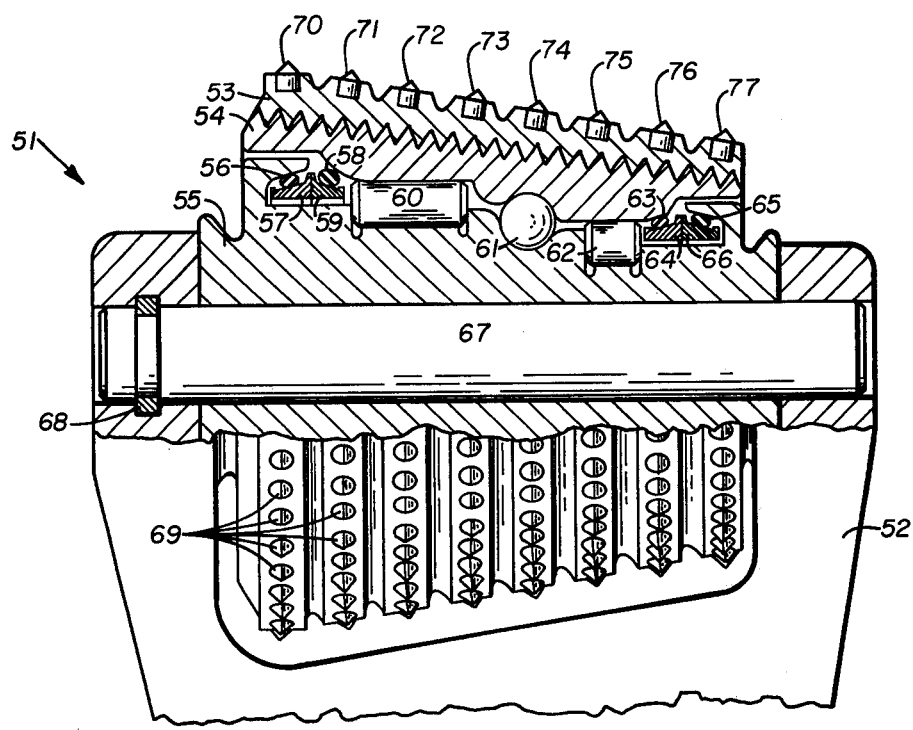
FIG. 4 is an illustration of still another embodiment of the present invention.

Referring now to FIG. 4, another embodiment of a cutter constructed in accordance with the present invention is illustrated. The cutter is designated generally by the reference number 51. The cutter 51 includes an outer cutter shell 53 threaded on an inner cutter shell 54. The outer cutter shell 53 will self-lock until replacement is required at the end of the cutting structure's service life. At that time, the outer cutter shell 53 may be removed by unthreading it from the inner cutter shell 54. A new cutter shell may be inserted in its place and the earth boring operation continued. The outer cutter shell 53 includes a multiplicity of carbide inserts arranged to form a series of annular rows 70–77. The individual carbide inserts are designated by the reference number 69. The outer cutter shell 53 is threaded onto the inner cutter shell 54 and together they are positioned around a bearing shell 55. The bearing shell 55 is securely locked in a saddle 52. The saddle 52 may be connected to the rotary head of an earth boring machine or to the body of an earth boring bit. It is to be understood that the cutter 51 could also be in the form of a conical cutter adapted to be journaled on one of the arms of a rotary rock bit.

The bearing shell 55 is locked in position in the saddle 52 by a main pin 67 and a retainer nail or roll pin 68. The bearing shell 55 remains firmly locked in place throughout the drilling operation due to a tenon and groove arrangement disclosed in U.S. Pat. No. 3,203,492 to C. L. Lichte, patented Aug. 31, 1965. A multiplicity of bearing systems including series of ball bearings 61, a series of inner roller bearings 62 and a series of outer roller bearings 60 promote rotation of the inner and outer cutter shells 53 and 54 about the bearing shell 55. Lubricant is retained in the bearing area by two sets of seal elements. The inner set of seal elements includes a pair of annular metal seal rings 64 and 66 that are positioned near the inner end of the cutter 51. A flexible rubber O-ring 65 is positioned between seal ring 66 and the bearing shell 55 to retain the seal ring 65 in the desired position and resiliently urge seal ring 66 against seal ring 64. A flexible rubber O-ring 63 is positioned between the inner cutter shell 54 and the seal ring 64 to retain the seal ring 63 in the desired position and resiliently urge the seal ring 64 against the seal ring 66. The outer set of seal elements includes a pair of annular metal seal rings 57 and 59 that are positioned near the outer end of the cutter 9. A flexible rubber O-ring 56 is positioned between the seal ring 57 and bearing shell 55 to retain the seal ring 56 in the desired position and resiliently urge seal ring 57 against seal ring 59. A flexible O-ring 58 is positioned between the inner cutter shell 54 and seal ring 59 to retain seal ring 59 in the desired position and resiliently urge seal ring 59 against seal ring 57.

The structural details of cutter 51 having been described, the operation of the cutter 51 will now be considered with reference to FIG. 4. The inner and outer cutter shells 53 and 54 are adapted to be mounted in the saddle 52 that is affixed to the rotary head (not shown) of an earth boring machine or to the body of a raise bit. The cutting inserts 69 contact the formation and form the desired borehole or tunnel. Should the outer cutter shell and cutting structure thereon become worn or damaged before the other elements of the cutter 51 fail, it is desirable to replace the outer cutter shell 53. In order to replace the outer cutter shell 53, the retainer element 68 is driven out of place in the saddle mount 52 and pin 67 is removed from the saddle mount 52. The bearing shell 55 and inner and outer cutter shells 53 and 54 are removed from the saddle mount 52. The outer cutter shell 53 is unthreaded from the inner cutter shell 54. On occasions when it is impossible to unthread outer cutter shell 53, the cutter shell may be severed and removed. A new outer cutter shell is threaded onto the inner cutter shell 54. The inner and outer cutter shells and bearing shell 55 are again inserted in the saddle mount 52. The pin 67 and the retainer 68 are repositioned in the saddle mount 52 to lock the cutter in place. The cutter 51 is ready for continued operation.

The embodiments of an invention in which an exclusive property or privilege is claimed are defined as follows:

1. A cutter apparatus for earth boring, comprising:
   a saddle having a pair of support arms;
   a bearing shell mounted between said support arms;
   an inner cutter shell mounted for rotation about said bearing shell, said inner cutter shell having a generally tapered conical exterior surface;
   threads on said generally tapered conical exterior surface of said inner cutter shell;
   an outer cutter shell mounted over said inner cutter shell, said outer cutter shell having an outer surface and a central passage, said central passage having a conical surface;
   threads on said conical surface of said central passage that engage the threads on said generally tapered conical exterior surface of said inner cutter shell; and
   a multiplicity of carbide inserts mounted in said outer surface of said outer cutter shell.

2. A rolling cutter member for an earth boring system that functions to form a hole in earth formations, comprising:
   a saddle having a pair of support arms;
   a bearing shell mounted between said support arms;
   an inner cutter shell mounted for rotation about said bearing shell, said inner cutter shell having a generally tapered conical exterior surface;
   threads along substantially all of said generally tapered conical exterior surface of said inner cutter shell;
   an outer cutter shell mounted over said inner cutter shell, said outer cutter shell having an outer surface and a central passage, said central passage having a conical surface;
   threads on said conical surface of said central passage that engage the threads along substantially all of said generally tapered conical exterior surface of said inner cutter shell; and
   a multiplicity of carbide inserts mounted in said outer surface of said outer cutter shell arranged to form a series of annular rows.

* * * * *